United States Patent [19]

Whittlesey et al.

[11] 4,287,267
[45] Sep. 1, 1981

[54] ZINC-CHLORINE BATTERY PLANT SYSTEM AND METHOD

[75] Inventors: Curtis C. Whittlesey, Birmingham; Matthew S. Mashikian, Huntington Woods, both of Mich.

[73] Assignee: Energy Development Associates, Inc., Madison Heights, Mich.

[21] Appl. No.: 153,094

[22] Filed: May 27, 1980

[51] Int. Cl.³ ............................................. H01M 2/20
[52] U.S. Cl. ........................................ 429/49; 429/61; 429/90; 429/122; 429/158
[58] Field of Search ............. 429/49, 61, 90, 121-123, 429/158, 160, 13, 156

[56] References Cited

U.S. PATENT DOCUMENTS 3,713,888  1/1973  Symons ................................. 429/51

OTHER PUBLICATIONS

Symons et al., "100 MWh Zinc-Chlorine Peak-Shaving Battery Plants"; The 13th Intersociety Energy Conversion Engineering Conference.
Whittlesey et al., "The Zinc-Chlorine Battery in the Best Facility, 1981"; Proceedings of the 14th Intersociety Energy Conversion Engineering Conference.

Primary Examiner—Anthony Skapars
Attorney, Agent, or Firm—Harness, Dickey & Pierce

[57] ABSTRACT

A zinc-chlorine battery plant system and method of redirecting the electrical current around a failed battery module. The battery plant includes a power conditioning unit, a plurality of battery modules connected electrically in series to form battery strings, a plurality of battery strings electrically connected in parallel to the power conditioning unit, and a bypass switch for each battery module in the battery plant. The bypass switch includes a normally open main contact across the power terminals of the battery module, and a set of normally closed auxiliary contacts for controlling the supply of reactants electrochemically transformed in the cells of the battery module. Upon the determination of a failure condition, the bypass switch for the failed battery module is energized to close the main contact and open the auxiliary contacts. Within a short time, the electrical current through the battery module will substantially decrease due to the cutoff of the supply of reactants, and the electrical current flow through the battery string will be redirected through the main contact of the bypass switch.

35 Claims, 8 Drawing Figures

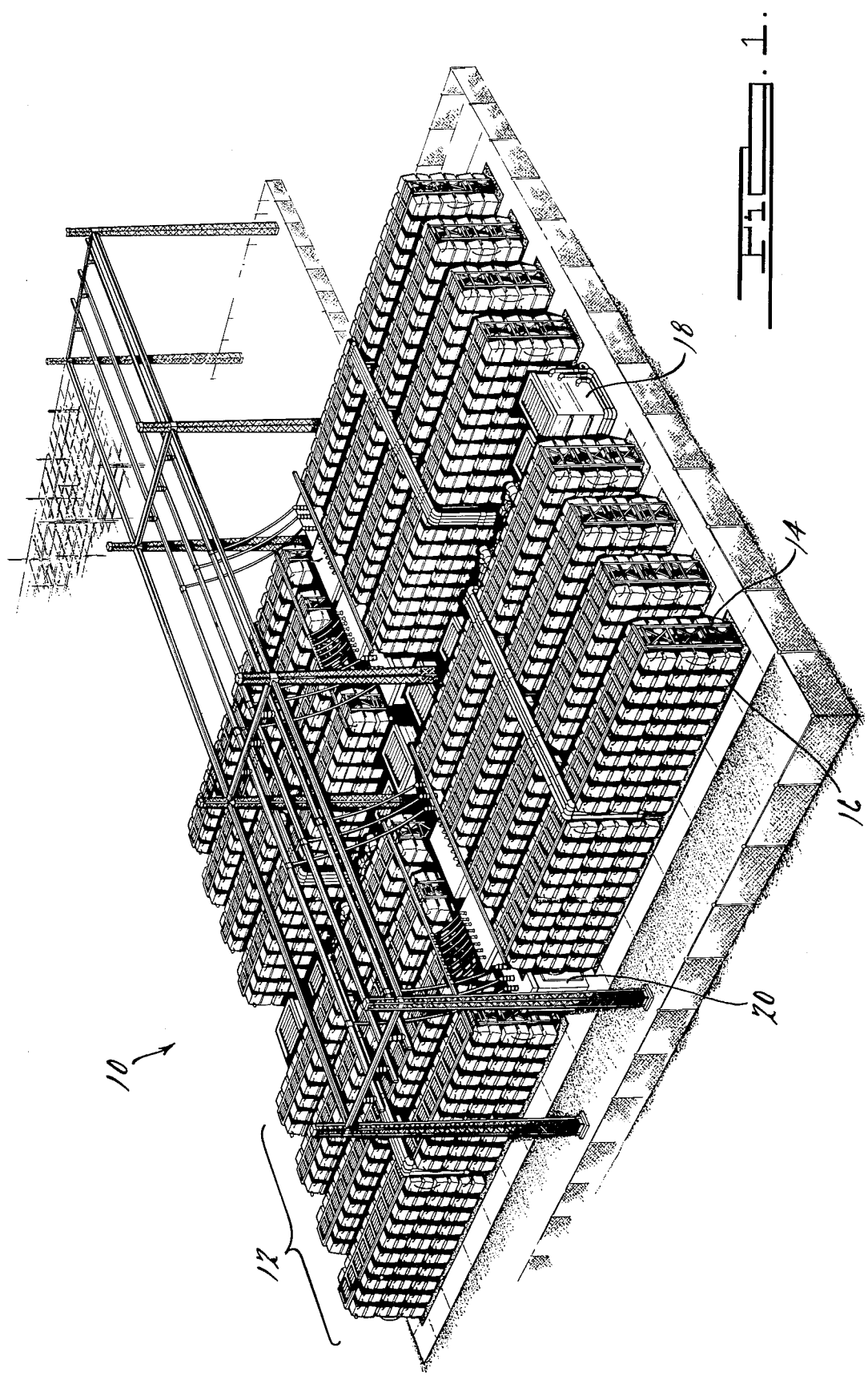

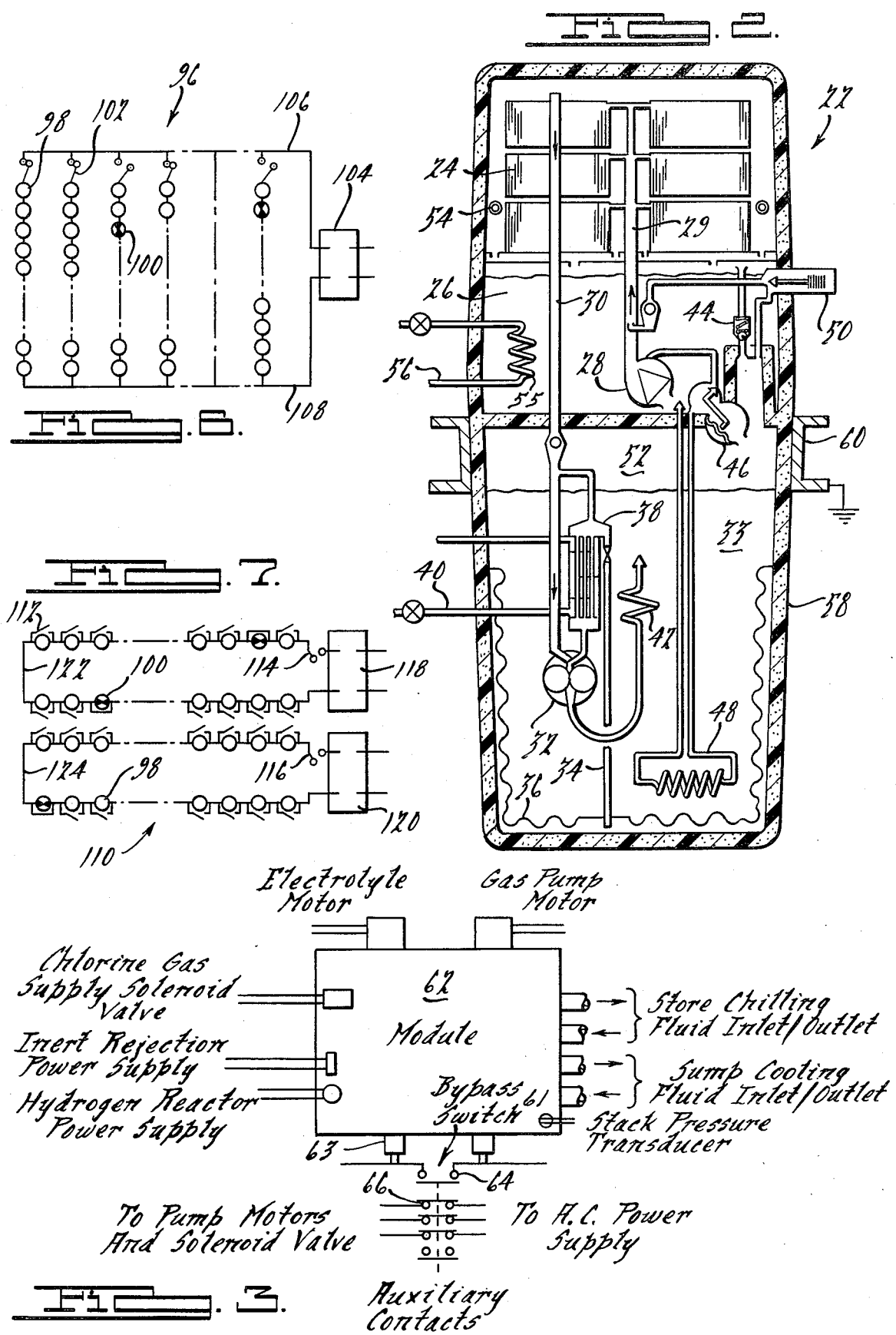

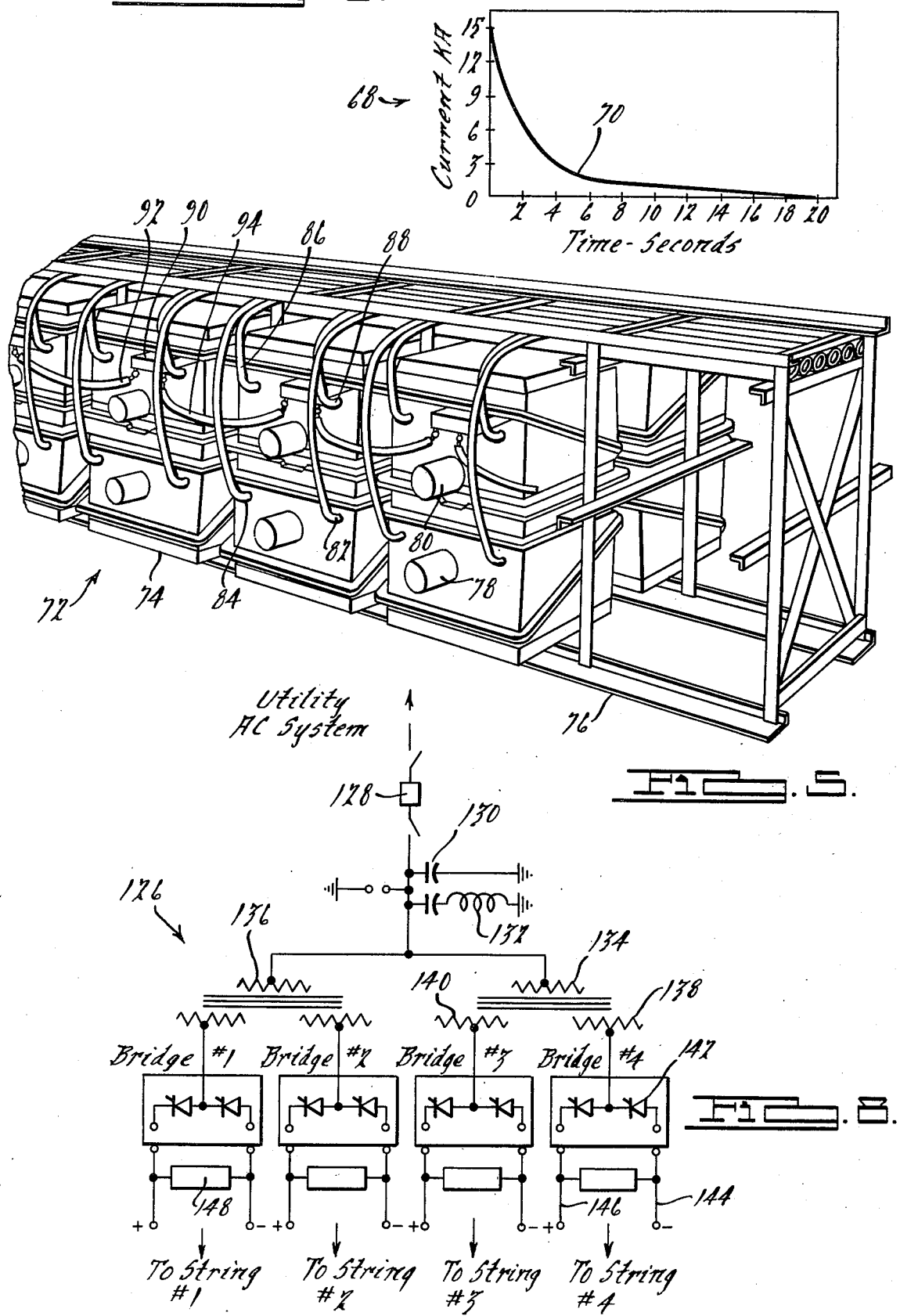

ZINC-CHLORINE BATTERY PLANT SYSTEM AND METHOD

The Government of the United States of America has rights in this invention pursuant to Contract No. DE-AC02-78ET26923 awarded by the U.S. Department of Energy.

BACKGROUND AND SUMMARY OF THE INVENTION

The present invention relates generally to electrochemical cells, and particularly to zinc-chlorine batteries combined to form a battery plant system.

Due to the increasing demand for electricity and the decreasing availability (and increasing cost) of distillate oil and natural gas, the need has arisen for an alternate method of supplying peak demand electricity. Presently, the electricity generated for peak demand is supplied from diesel engines and combustion turbines, which are fired by distillate oil and natural gas. One such method is the use of secondary energy storage batteries to store electricity generated from utility baseload facilities during the night or off-peak hours, and discharging these batteries during the hours of peak demand. Secondary energy storage batteries currently being considered for this application include lead-acid, lithium-iron sulfide, sodium sulfur, sodium-chloride, and zinc-chlorine batteries. In order to be utilized in this application, these batteries would necessarily have to be scaled up to battery plants capable of delivering electrical energy on the order of 100 mega-watt hours in a single discharge. This scale up would generally be achieved by combining large numbers of cells into module-type units, and interconnecting a suitable number of these modules.

One of the primary concerns in such a scale up, is the reliability of the battery plant. This reliability may generally be characterized as a function of the number of battery module failures. Since these modules would usually be connected electrically in series to form battery strings, the failure of a single module will affect the operation of the entire string. If the failure is such that the battery string must be disconnected from the electrical current flow in the battery plant, this has the effect of the failure of all of the battery modules in the string.

The present invention provides a novel battery plant system and method of redirecting the electrical current around a failed module, so that only the failed module is removed and the reliability of the battery plant is maximized. Particularly, the battery plant according to the present invention employs a bypass switch for each of the battery modules in the battery plant. The bypass switch contains a normally open main contact across the power terminals of the battery module and a plurality of normally closed auxiliary contacts for controlling the supply of reactants electrochemically transformed in the cells of the battery module. Thus, open the determination of a failure condition, the bypass switch is energized to close the main contact and concomitantly open the auxiliary contacts. With the supply of reactants to the cells turned off, the electrical current through the battery will rapidly decrease, and the current through the battery string will be redirected through the bypass switch main contact.

The present invention further provides for the employment of battery string isolation switches which need not have to break d.c. current when the entire battery string must be disconnected in response to a failure condition. This is achieved by first turning off the supply of reactants to the entire battery string by energizing at least one auxiliary switch. Again, within a short time after the supply of reactants is turned off, the current through the battery string will substantially decrease, and allow the isolation switch for the string being disconnected to open under essentially no-load conditions.

Although the description is directed to zinc-chlorine batteries, the present invention may also be utilized in conjunction with suitable electrochemical cells which store the reactants remote from the site of reaction, and which can tolerate high short-circuit currents. Other features and advantages of the invention will become apparent in view of the drawings and the following detailed description of the preferred embodiments.

BRIEF DESCRIPTION OF THE DRAWINGS

FIG. 1 is a perspective view of a zinc-chlorine battery plant design.

FIG. 2 is a schematic representation of a zinc-chlorine battery module design.

FIG. 3 is a schematic representation of a bypass switch in connection with a zinc-chlorine battery module.

FIG. 4 is a graph of the short circuit current flow through a zinc-chlorine battery module immediately after energizing the bypass switch.

FIG. 5 is a perspective view of a partial single tier zinc-chlorine battery rack design.

FIG. 6 is a schematic representation of an arrangement of zinc-chlorine battery modules in a battery plant without employing a bypass switch for each battery module.

FIG. 7 is a schematic representation of an arrangement of zinc-chlorine battery modules in a battery plant employing a bypass switch for each battery module.

FIG. 8 is a schematic representation of a power conditioning unit for a zinc-chlorine battery plant.

DESCRIPTION OF THE PREFERRED EMBODIMENTS

Referring to FIG. 1, a perspective view of a design for a 100 mega-watt hour (MWh) zinc-chlorine battery plant 10. The 100 MWh figure refers to the projected energy delivery capacity during the discharge of the battery plant. Battery plant 10 is comprised of four separate battery units 12. Each battery unit is comprised of four battery strings 14 connected electrically in parallel, a refrigeration and cooling system 18, and a power conditioning system 20. Each battery string includes 120 battery modules 16 connected electrically in series. In operation, the battery plant will store electrical energy received from an electric utility baseload generating facility during night or off-peak hours (in the charge mode), and will deliver the stored energy back to the utility system during the hours of peak demand (in the discharge mode).

Referring to FIG. 2, a schematic representation of a zinc-chlorine battery module 22 is shown. The stack section of the module is comprised of six submodules 24. Each submodule is generally comprised of a large number of electrochemical cells formed from a zinc electrode and chlorine electrode pair. The term "zinc electrode" refers to the fact that zinc metal is electrochemically deposited on this electrode during the charging of the battery. Similarly, the term "chlorine electrode"

refers to the fact that chlorine gas is generated at this electrode during the charging of the battery. The sump section of the module is generally comprised of an electrolyte reservoir 26, and an electrolyte pump 28. During both charge and discharge modes, zinc-chlorine electrolyte in reservoir 28 is pumped through distribution manifold 29 to all of the cells in submodules 24. The electrolyte overflows from the cells of the battery stack, and returns by gravity to the electrolyte reservoir through separate return channels. The chlorine gas generated from these cells is pumped through tube 30 into the hydrate store section of the module by gas pump 32. This pump also forces water from reservoir 33 through tube 34, where it is cooled in heat exchanger 38, and mixed with the chlorine gas. This mixture of cold water and chlorine gas is then pumped through tube 42, where chlorine hydrate is formed. Filter 36 acts to prevent the chlorine hydrate spilling into reservoir 33 from blocking the inlet to tube 34. Tube 40 indicates coolant fluid supply line from the refrigeration equipment to heat exchanger 38.

Gas pump 32 also acts to create an average 5 p.s.i. pressure differential between the stack and hydrate store sections of the module during both charge and discharge modes. Pressure relief valve 44 insures that this pressure differential does not become excessive. During discharge, valve 46 controls the rate of electrolyte transfer through heat exchanger 48 in the hydrate store section. The heat from this warm electrolyte decomposes the chlorine hydrate back into chlorine gas and water. The chlorine gas thereby recovered is transferred from gas space 52 in the hydrate store section back to submodules 24 in the stack section through distribution manifold 29, under the control of solenoid valve 50. The chlorine gas then dissolves into the electrolyte and is electrochemically consumed of transformed into chloride ions. Simultaneously, the zinc metal deposited on the zinc electrodes during charge is electrochemically transformed into zinc ions. These electrochemical reactions cause electrical current flow through the battery stack, and provide electrical power at the power terminals of the module (not shown) connected to the submodules 24.

A small amount of hydrogen gas is also generated from the cells in submodules 24. In order to prevent the accumulation of this hydrogen gas, fluorescent lights 54 are provided in the stack section to react the hydrogen gas with the chlorine gas to form hydrogen chloride gas. A small amount of carbon dioxide gas is also generated from the cells in submodules 24. Although not shown, an inert gas rejection device, based on a chlorine-chlorine electrochemical cell, is provided to remove this carbon dioxide gas, as well as any other gas inert to the system, from the module. The sump section also includes heat exchanger 55 to control and maintain the temperature of the electrolyte at a desired level. Tube 56 indicates the coolant fluid supply line to the heat exchanger. Housing 58 provides a hermetically sealed enclosure for the above-identified components in the module. This housing is generally comprised of an inner plastic liner, an outer fiberglass shell, and a layer of insulating material interposed between them. Finally, steel support number 60 is attached to housing 58 to assist in the movement of the module.

Referring to FIG. 3, a schematic representation of a bypass switch 61 in connection with a zinc-chlorine battery module 62 is shown. Particularly, this representation illustrates the various electrical interconnections (for the electrolyte and gas pumps, the chlorine gas supply solenoid valve, inert rejection device, hydrogen gas fluorescent light reactor, and stack section pressure transducer) and mechanical interconnections (for the hydrate store coolant fluid, and the sump cooling fluid) to the module. Bypass switch 61 is connected across the power terminals 63, which direct the electrical current flow into and out of the battery module. The bypass switch has a main contact 64 and four auxiliary contacts 66. The main contact is normally open to allow electrical current flow through the battery. The three normally closed auxiliary contacts allow electrical current flow to the electrolyte pump motor, the gas pump motor, and the chlorine gas supply solenoid valve, until the bypass switch is energized. The normally open auxiliary contact prevents electrical current flow to an alarm circuit until the bypass switch is energized. As indicated by the dashed line interconnecting the main and auxiliary contacts, the bypass switch may be constructed so that all of the contacts are closed or opened simultaneously upon the energization of the bypass switch. Alternatively, the bypass switch could be constructed so that the auxiliary contacts are closed or opened before the main contact is closed. Further, the auxiliary contacts may also be located remotely from the bypass switch to form an auxiliary switch.

Before discussing how the bypass switch is employed in the method according to the present invention, reference is made to FIG. 4. This figure illustrates a graph 68 of the short-circuit circuit flow through the battery module immediately after energizing the bypass switch. Short-circuit current curve 70 was obtained experimentally from a battery module, which immediately before the short circuit was operating at an electrical current flow of 540 amperes. Upon creating a short circuit across the power terminals (i.e., closing the main contacts) the current flow through the battery module jumped to 15,000 amperes. However, this short circuit current flow decayed rapidly in a few seconds. This was due to the fact that the electrolyte pump motor, the gas pump motor, and chlorine gas supply solenoid valve were turned off (i.e., opening the three normally closed auxiliary contacts) the instant the short circuit was initiated. By turning off these auxiliary components, the supply of electrolyte and chlorine gas to the submodules in the stack section of the battery module is interrupted. Without a continued supply of electrolyte and chlorine gas, the existing reactants (zinc and chloride ions during charge, and dissolved chlorine gas during discharge) in the cells will be quickly depleted. This will prevent further electrochemical reactions in the cells, and thereby terminate or discontinue electrical current flow through the cell. Attention should also be made of the fact that zinc-chlorine battery modules are capable of withstanding this magnitude of short-circuit flow without sustaining damage.

It may be appreciated by one skilled in the art that the large number of battery modules in the battery plant and the complexity of the battery module itself increase the likelihood that any one module will not operate properly or fail. In this event, the employment of a bypass switch for each battery module will permit the redirecting or the bypassing of electrical current flow around the failed battery module. In order to determine if a battery module is operating properly, the gas pressure in the stack section is sampled periodically. Other operating parameters may also be sampled, such as temperatures and pressures at various points in the battery module, the speed of the electrolyte and gas pump motors, and the pH and specific gravity of the electrolyte. The automatic controller for the battery plant would sample one or more of these operating parameters, and determine a fault condition when a certain predetermined range is exceeded. The battery module generating the fault condition would then be identified, and the bypass switch would be energized in response to this fault condition.

The bypass switch may be constructed so that it is electromagnetically triggered and manually re-set. Thus, the closing of the main contact, the opening of the three normally closed contacts, and the closing of the normally open auxiliary contact may be imparted by a spring, which is manually cocked. Alternately, a rotary cam-type mechanism may be employed, in which case operator intervention is not needed to re-set the switch. It should be noted that the bypass switch will only be re-set when the electrical current flow through the battery string is discontinued. As the bypass switch is not intended to break d.c. current, its construction need not be complicated. The auxiliary contacts need only be capable of interrupting an a.c. current on the order of 15 amperes. Further, as the voltage across the power terminals of the battery module is on the order of 20 volts d.c., the main contact separation need only be a fraction of an inch. However, since the short-circuit current is very large immediately upon closing, the bypass switch should be constructed so that the entire contact area comes into intimate contact at once.

Referring to FIG. 5, a perspective view of a partial single tier zinc-chlorine battery rack 72 is shown. This battery rack forms a portion of the three-tiered battery plant of FIG. 1. Particularly, this figure illustrates a plurality of battery modules 74 in a rack structure 76, where each battery module has a gas pump motor 78, an electrolyte pump motor 80, a set of hydrate store coolant fluid tubes 82 and 84, and a set of sump coolant fluid tubes 86 and 88. Each battery module also includes a bypass switch 90 across the power terminals of the battery module. As indicated, the bypass switch is enclosed in a housing to prevent corrosive action on the contacts from any contaminents present in the air. Further, this figure illustrates that each of the battery modules is connected electrically in series to the other battery modules in the battery string via electrical conduits 92 and 94.

Referring to FIG. 6, a schematic representation of an arrangement 96 of zinc-chlorine battery modules 98 in a battery plant is shown. In this early design, bypass switches were not employed. Thus, if a module failed, as indicated at 100, the entire string of series connected modules would have to be disconnected from the system in order to isolate the failed module. This would be accomplished by opening a battery string isolation switch 102, which would prevent electrical current flow to or from power conditioning unit 104 for that battery string via electrical conduits 106 and 108. There were two disadvantages with this approach. First, the reliability of the battery plant is decreased when a number of modules must be removed from operation when a single module fails. Second, the battery string isolation switch would necessarily be expensive as it must be capable of breaking d.c. currents on the order of 500 amperes. Of course, the number of battery modules in a battery string could be reduced. However, this would add to the number of battery string isolation switches necessary, and reduce the efficiency of the power conditioning equipment. The loss in efficiency would result in having to convert high voltage a.c. power to low voltage d.c. power during charging, and reversing this process during discharge.

Referring to FIG. 7, a schematic representation of an arrangement 110 of zinc-chlorine battery modules 98 for two strings of a battery plant is shown. In this design, a bypass switch 112 is employed for each battery module. Now when a battery module fails, the bypass switch would be energized, and the electrical current flow would be redirected around that failed module. Thus, in this arrangement the reliability of the battery plant is maximized because only the failed module is removed from the system.

FIG. 7 also serves to illustrate another aspect of the present invention, and that is the employment of short-circuit characteristics of the zinc-chlorine battery module with reference to the battery string isolation switches 114 and 116. If all of the electrolyte pump motors, the gas pump motors, and chlorine gas supply solenoid valves for an entire string of battery modules could be turned off concomitantly, in a short time all of the reactants in the cells of these battery modules would be depleted, and the electrical current flow through the string (via conduits 122 or 124) would substantially decrease. This would permit the battery string isolation switch (114 or 116) to open under a very low d.c. current flow. Although not shown in FIG. 7, this battery plant design employs a switch in each of the auxiliary components a.c. power lines to control the supply of electrical power to the auxiliary components for the entire battery string. Thus, a single switch would be used to turn off all of the electrolyte pump motors in a battery string. As with the bypass switch, these auxiliary switches and the battery string isolation switches may be electromagnetically triggered or rotary cam operated from the automatic controller for the battery plant. With this construction, the automatic controller could sense for fault conditions in the battery string, and respond to a fault condition by energizing the normally closed auxiliary switches to open. Then, after a time interval sufficient to permit a substantial decrease in the electrical current flow through the battery string, the isolation switch for that string would be energized to open. An example of such a fault condition would be a sudden change in the current flow through the battery string as the result of the development of a ground fault.

FIG. 7 also illustrates the use of separate power conditioning equipment 118 and 120 for each battery string. This is to minimize current imbalances in the battery plant which would be caused when a failed module is bypassed. For example, if the battery module arrangement of FIG. 6 employed a bypass switch for each battery module, the bypassing of a failed battery module in one of the strings will cause that string to have a lower voltage than the other strings. As all of the battery strings are connected in parallel, the current will re-distribute so that the current in the string with the failed module increases in order to increase the string voltage.

Referring to FIG. 8, a schematic representation for a (battery unit) power conditioning unit 126 is shown. As indicated, a separate converter bridge is employed for each of the four battery strings. Disconnect switch 128 provides a visible indication of whether or not the battery unit is connected to the electric utility a.c. system. Interposed between the disconnect switch and the transformer are power factor correction capacitors 130 and a harmonic filter 132. The primary windings 134 and 136 of the transformer each have a set of secondary windings 138 and 140. Each converter bridge is generally comprised of a 6-pulse thyristor bridge 142 for charge and discharge. Electrical conduits 144 and 146 provide the d.c. power lines to the battery string, and the block 148 connected between them indicates the provision for standard d.c. protection equipment. Because each converter bridge is individually controlled, variations in a battery string voltage (such as due to a bypassed battery module) may be compensated for by charging the thyristor firing angles.

It will be appreciated by those skilled in the art that various changes and modifications may be made to the system and methods described in the specification without departing from the spirit and scope of the invention as defined by the appended claims. The various embodiments which have been set forth were for the purpose of illustration and were not intended to limit the invention.

We claim:

1. A method of discontinuing the electrical current flow through at least one secondary energy storage battery module in a battery plant having a plurality of battery modules connected in series to form a battery string, a plurality of said battery strings connected electrically in parallel, first switching means for controlling the supply of at least one reactant electrochemically transformed in said battery modules, and second switching means for redirecting the electrical current flow through said battery plant, comprising the steps of:
   energizing said first switching means so that the supply of said reactant in at least one of said battery modules is interrupted; and
   energizing said second switching means so that the electrical current is discontinued in at least one of said battery modules and redirected through said battery plant.

2. The method according to claim 1, wherein said second switching means includes a normally open bypass switch, for each of said battery modules in said battery plant, connected across the power terminals directing electrical current flow through said battery modules.

3. The method according to claim 2, wherein said first switching means includes first normally closed auxiliary switching means, in association with each of said bypass switches, for controlling the supply of at least one reactant electrochemically transformed in said battery modules.

4. The method according to claim 3, including the additional step of:
   sensing at least one operating parameter for each of said battery modules in said battery plant.

5. The method according to claim 4, including the additional step of:
   determining a failure condition when said operating parameter for one of said battery modules exceeds a predetermined range.

6. The method according to claim 5, including the additional step of:
   identifying said battery module generating said failure condition.

7. The method according to claim 6, wherein said first auxiliary switching means for said failed module is energized to open and said bypass switch for said failed module is energized to close in response to said failure condition, so that the electrical current flow is discontinued through said failed battery module.

8. The method according to claim 1, wherein said second switching means includes normally closed isolation switching means for directing electrical current flow through each of said battery strings in each battery plant.

9. The method according to claim 8, wherein said first switching means includes second normally closed auxiliary switching means, for each of said battery strings, for controlling the supply of at least one reactant for all of the battery modules in said battery string.

10. The method according to claim 9, including the step of:
    sensing the electrical current flow through each of said battery strings.

11. The method according to claim 10, including the step of:
    determining a fault condition from a predetermined change in said electrical current flow through said battery string.

12. The method according to claim 11, wherein said second normally closed switching means for said failed string is energized to open in response to said fault condition, and said normally closed isolating switching means is energized to open after a time interval to permit a substantial electrical current decrease through said battery string.

13. A method of bypassing a failed electrochemical cell in a string of electrochemical cells connected electrically in series, each of said cells having power terminal means for directing electrical current flow into and out of said cell, a normally open switch connected across said power terminal means, and a normally closed switch for controlling the supply of at least one reactant electrochemically transformed in said cell, comprising the steps of:
    opening said normally closed switch for said failed cell to discontinue the supply of said reactant; and
    closing said normally open switch for said failed cell to direct electrical current flow across said power terminal means.

14. The method according to claim 13, including the additional step of:
    sensing at least one operating parameter for each of said cells in said string.

15. The method according to claim 14, including the additional step of:
    determining a failure condition when said operating parameter for one of said cells exceeds a predetermined range.

16. The method according to claim 15, including the additional step of:
    identifying said cell generating said failure condition.

17. The method according to claim 16, wherein said opening of said normally closed switch and said closing of said normally open switch occurs in response to said failure condition.

18. The method according to claim 13, wherein said opening of said normally closed switch occurs before said closing of said normally open switch.

19. The method according to claim 13, wherein said opening of said normally closed switch occurs concomitantly with said closing of said normally open switch.

20. The method according to claim 13, wherein said normally closed switch is in association with said normally open switch.

21. The method according to claim 13, wherein said electrochemical cell is a secondary energy storage battery.

22. The method according to claim 21, wherein said secondary energy storage battery is a zinc-chlorine battery.

23. The method according to claim 22, wherein said operating parameter is a pressure parameter.

24. The method according to claim 22, wherein said normally closed switch includes a plurality of contacts.

25. The method according to claim 23, wherein one of said contacts is used to control the flow of electrolyte circulating in said zinc-chlorine battery.

26. The method according to claim 23, wherein one of said contacts controls a chlorine gas supply valve in said zinc-chlorine battery.

27. The method according to claim 25, further including the step of:
generating an alarm signal in response to said failure condition.

28. A method of isolating a string of secondary energy storage batteries connected electrically in series in a battery plant having a plurality of said battery strings connected electrically in parallel, where each of said battery strings includes a first normally-closed switch for directing electrical current flow into and out of said battery string, and a second normally-closed switch for directing electrical current flow to an auxiliary means for supplying at least one reactant electrochemically transformed in each of said secondary energy storage batteries in said string, comprising the steps of:
opening said second normally closed switch for said battery string to be isolated to interrupt the supply of said reactant to said batteries; and
opening said first normally closed switch for said battery string to be isolated after a time interval sufficient to permit a substantial electrical current decrease through said battery string.

29. The method according to claim 28, including the step of:
sensing the electrical current flow through each of said battery strings.

30. The method according to claim 29, including the step of:
determining a fault condition from a predetermined change in said electrical current flow through said battery string.

31. The method according to claim 30, wherein said opening of said second normally-closed switch occurs in response to said fault condition for said string.

32. The method according to claim 31, including the step of:
generating an alarm signal in response to said fault condition.

33. The method according to claim 28, wherein said secondary energy storage batteries are zinc-chlorine batteries.

34. A battery plant system, comprising:
power conditioning means for converting alternating current electrical power to direct current electrical power during the charging of said battery plant and converting direct current electrical power to alternating current electrical power during the discharging of said battery plant;
a plurality of battery strings connected electrically in parallel to said power conditioning means;
a plurality of battery modules connected electrically in series to form said battery strings; and
bypass switching means, in association with each of said battery modules, for redirecting electrical current flow around a failed battery module in response to a failure condition.

35. The battery plant system according to claim 34, further including:
auxiliary switching means for controlling the supply of at least one reactant, electrochemically transformed in said battery modules, for all of said battery modules in said battery string; and
isolation switching means for interrupting the electrical connection between at least one of said battery strings and said power conditioning means in response to a fault condition and the opening of said auxiliary switching means.

* * * * *

UNITED STATES PATENT AND TRADEMARK OFFICE
CERTIFICATE OF CORRECTION

PATENT NO. : 4,287,267
DATED : September 1, 1981
INVENTOR(S) : Whittlesey, Curtis C. and Mashikian, Matthew S.

It is certified that error appears in the above—identified patent and that said Letters Patent is hereby corrected as shown below:

Column 1, line 58, "open" should be --upon--

Column 3, line 36, "of" should be --or--

Column 8, line 4, Claim 8, "each", second occurrence, should be -- said --.

Signed and Sealed this

Twenty-second Day of December 1981

[SEAL]

Attest:

GERALD J. MOSSINGHOFF

Attesting Officer    Commissioner of Patents and Trademarks